(12) United States Patent
Lüer (10) Patent No.: US 9,034,190 B2
(45) Date of Patent: May 19, 2015

(54) CYLINDRICAL LIQUID FILTERING DEVICE WITH CENTRAL ROTOR, SUPPORTED FILTER ELEMENTS, AND DIVERGENT INNER WALL RADII THAT FORM CURVILINEAR WING-SHAPED BULGES TO GUIDE THE LIQUID TOWARD THE FILTER ELEMENTS

(75) Inventor: Andreas Lüer, Gmunden (AT)

(73) Assignee: Pantreon GmbH, Gmunden (AT)

( * ) Notice: Subject to any disclaimer, the term of this patent is extended or adjusted under 35 U.S.C. 154(b) by 44 days.

(21) Appl. No.: 13/635,563

(22) PCT Filed: Mar. 14, 2011

(86) PCT No.: PCT/AT2011/000129
§ 371 (c)(1),
(2), (4) Date: Sep. 17, 2012

(87) PCT Pub. No.: WO2011/120061
PCT Pub. Date: Oct. 6, 2011

(65) Prior Publication Data
US 2013/0015120 A1    Jan. 17, 2013

(30) Foreign Application Priority Data
Mar. 29, 2010  (AT) .................................... 496/2010

(51) Int. Cl.
*B01D 33/00*  (2006.01)
*B01D 35/12*  (2006.01)
(Continued)

(52) U.S. Cl.
CPC ................ *B01D 33/31* (2013.01); *B01D 35/30* (2013.01); *B01D 63/16* (2013.01); *B01D 2201/62* (2013.01); *B01D 2313/20* (2013.01); *B01D 2315/02* (2013.01)

(58) Field of Classification Search
CPC ....... A61M 37/00; B01D 33/02; B01D 33/31; B01D 25/34; B01D 29/02; B01D 29/38; B01D 29/86; B01D 33/37; B01D 33/68; B01D 33/763; B01D 24/00; B01D 25/00; B01D 27/00; B01D 29/00; B01D 29/0013; B01D 29/0075; B01D 29/009; B01D 29/39; B01D 29/114; B01D 33/00; B01D 33/0045; B01D 33/0064; B01D 33/0087
See application file for complete search history.

(56) References Cited

U.S. PATENT DOCUMENTS 3,438,497 A * 4/1969 Maestrelli ...................... 210/791
3,583,567 A * 6/1971 Maestrelli ...................... 210/330
(Continued)

FOREIGN PATENT DOCUMENTS

AT  503 567      11/2007
DE  2 308 879    8/1973
(Continued)

OTHER PUBLICATIONS
International Search Report of PCT/AT2011/000129, date of mailing Jun. 15, 2011.

*Primary Examiner* — Dirk Bass
*Assistant Examiner* — Hayden Brewster
(74) *Attorney, Agent, or Firm* — Collard & Roe, P.C.

(57) ABSTRACT

A device for filtering liquids has a container, units for introducing a liquid to be filtered into the container, a container outlet for unfiltered liquid to be discharged from the container, and at least one rotor, which is drivable to rotate around the container axis. The rotor has a hollow shaft mounted in an end wall and a support device fastened thereon for filter elements, which are arranged with a clearance to the container axis or rotate around their own axis. The interior of the filter elements opens via the support device and the hollow shaft out of the container as the discharge for filtered liquid. To provide improved filtration conditions, the container internal radius of the inner wall of the container circumferential shell is enlarged up to a maximum in the container circumferential direction while bulging the inner wall between two minima. The bulge forms a guide unit which guides the liquid toward the filter elements.

12 Claims, 9 Drawing Sheets

(51) Int. Cl.
    *B01D 33/31*     (2006.01)
    *B01D 35/30*     (2006.01)
    *B01D 63/16*     (2006.01)

(56) References Cited

U.S. PATENT DOCUMENTS

| | | |
|---|---|---|
| 3,840,121 A | 10/1974 | Baram |
| 4,332,541 A | 6/1982 | Anders |
| 5,154,825 A | 10/1992 | Kupka |
| 5,403,481 A | 4/1995 | Kupka |
| 5,474,675 A | 12/1995 | Kupka |
| 2006/0041216 A1 | 2/2006 | McLaughlin |

FOREIGN PATENT DOCUMENTS

| | | |
|---|---|---|
| DE | 3 606 184 | 8/1987 |
| EP | 0 370 118 | 5/1990 |
| EP | 0 377 054 | 7/1990 |
| EP | 0 577 854 | 1/1994 |

* cited by examiner

CYLINDRICAL LIQUID FILTERING DEVICE WITH CENTRAL ROTOR, SUPPORTED FILTER ELEMENTS, AND DIVERGENT INNER WALL RADII THAT FORM CURVILINEAR WING-SHAPED BULGES TO GUIDE THE LIQUID TOWARD THE FILTER ELEMENTS

CROSS REFERENCE TO RELATED APPLICATIONS

This application is the National Stage of PCT/AT2011/000129 filed on Mar. 14, 2011, which claims priority under 35 U.S.C. §119 of Austrian Application No. A 496/2010 filed on Mar. 29, 2010, the disclosure of which is incorporated by reference. The international application under PCT article 21(2) was not published in English.

1. FIELD OF THE INVENTION

The invention relates to a device for filtering liquids, having a container, units for introducing a liquid to be filtered into the container, a container outlet for unfiltered liquid to be discharged from the container, and at least one rotor, which is drivable to rotate around the container axis, having a hollow shaft mounted in an end wall and a support device fastened thereon for filter elements, which are arranged with a clearance to the container axis or rotate around their own axis, and whose interior opens via the support device and the hollow shaft out of the container as the discharge for filtered liquid.

2. DESCRIPTION OF THE PRIOR ART

Such known devices (EP 577 854 B1) comprise a rotor as a stirring body, whose stirring elements are formed by tubular filter elements with vertical incident flow. The main problem in the membrane filtration of liquids, namely the formation of cover layers on the membrane surface and the shrinkage of the effective filter area and blocking of the membrane pores thus caused, is therefore prevented or reduced. These cover layers typically arise through agglomeration of solid particles separated on the membrane pores and the concentration thereof in the region of the membrane surface. This effect may be avoided during a continuous filtration process using such devices in that, through the rotation of the filter elements in the container, turbulent transverse flows and therefore shear forces are generated on the membrane surfaces, which cause continuous mechanical cleaning of the filter elements and continuous swirling through of the liquids to be filtered.

These devices are capable of achieving high shear rates and turbulences. The core part is a closed filter container, in which one or more rotating slewing rings are driven by motors. The filtered liquids are collected in the rotor originating from tubular, or also disc-shaped or the like, filter elements (AT 503 567 A) and discharged via rotor spokes, rotor hub, and the hollow shaft from the interior of the container. The filter modules are installed on the rotor and sealed against high pressures prevailing in the container. However, during a rotation of large horizontally aligned filter surfaces with incident flow, extreme scattering in the overflow conditions, the trans-membrane pressure, and undesired shear or pressure spikes occur over the rotor radius.

During a rotation of the filter elements in the container, it is necessary to prevent the liquid from rotating with the filter elements, in order to achieve the relative speed between liquid and filter surface necessary for cleaning the filter. This is typically achieved using baffles arranged in the container or on the container inner wall, which cause unnecessary turbulences and shear or pressure spikes beyond the filter surfaces, however.

For filtering, the liquid in the container is continuously concentrated in operation, since the filtrate/permeate flows out continuously through the filter elements and new liquid is supplied in accordance with the pressure drop. In operation, this type of concentration can be continued until the viscosity of the solution has reached a maximum value, at which the flow rate is still cost-effective, through increase of the solid content. The suspension concentrate is then emptied via the container outlet or continuously drained off during operation. In order to allow continuous operation of the device in the case of such devices, it has already been proposed that the inner wall of the container circumferential shell be expanded toward the container outlet while forming a guide unit for the liquid along the container axis (AT 503 567 A).

SUMMARY OF THE INVENTION

The invention is based on the object of providing a device of the type described at the beginning, which avoids the above-mentioned disadvantages and ensures improved filter performance using simple means, in particular, with the least possible outlay, a turbulent flow being achieved over the entire filter surface and turbulent flows being decreased as much as possible outside the filter surfaces.

The invention achieves this object in that the container internal radius of the inner wall of the container circumferential shell is enlarged up to a maximum while bulging out the inner wall in the container circumferential direction between two minima, this bulge forming a guide unit which guides the liquid toward the filter elements.

The guide units according to the invention, which extend in particular over the container height, avoid excess turbulent flows outside the rotation region of the filter elements in that the liquid is first guided undisturbed, decelerated, and calmed in this region and is subsequently accelerated while applying no turbulence or the least possible turbulence and guided directly toward the filter elements, i.e., toward the container interior. Using the invention, it is possible to guide the liquid stream, which is conducted outward by the rotation of the filter elements in the rotational direction and by the centrifugal forces, very efficiently back to the filter surfaces and to reduce the flow speed of the liquid in relation to the circumferential speed of the rotating filter elements. Therefore, an increased relative speed can be achieved between the rotating filter elements and the fluidically braked liquid. The goal of the flow guiding is to keep the turbulences of the flow within the region of the filter elements as high as possible, while they are to be kept as small as possible outside the filter modules, for the purpose of higher energy efficiency for the rotor drive. Therefore, possible changes in the molecular structure and the physical phases of the liquid to be filtered due to mechanical stress can also be avoided. The described bulges of the inner wall of the container circumferential shell preferably have a cross-section similar to a wing profile for fluidic reasons, which also bulges outward originating from a cylindrical circumferential shell over a specific circumferential section.

In one possible embodiment of the invention, the container can be implemented as at least regionally open to the flow for the fluid to be filtered, in particular in the region of top and/or bottom shell end wall, and the device can be inserted into a type of outer container, which can also be a body of water or stream, a partial vacuum being able to be built up in the discharge for filtered liquid to improve the filter performance of the filter elements.

For this purpose, the container circumferential cross-section of the inner wall of the container circumferential shell is preferably divided into at least two ring segments and the container internal radius is enlarged up to the maximum in the container circumferential direction of at least one, preferably each ring segment between the two minima. In the region of the bulge, elevated pressures arise because of the surfaces having incident flow opposite to the rotational direction. The number of the ring segments arranged around the container circumference and the geometry or the dimensions, respectively, of the bulges are dependent on the respective intended use of the device and are left to a person skilled in the art.

Particularly advantageous flow conditions result if each ring segment has at least three sections, a calming section having at least approximately uniform container internal radius, a momentum section having small radius of curvature and an end section pointing toward the container interior, and an interposed transition section. Therefore, jumps or kinks in the guide unit, which cause additional turbulences, are avoided in particular.

In order to further improve the washing around the filter elements and also provide turbulent conditions during the washing around of the filter surfaces in the range of lesser circumferential and centrifugal forces, it is proposed that a rotor or stator having at least one guide unit for the liquid be arranged in the region of the container axis. For this purpose, the rotor external radius of the rotor outer wall can be reduced to a minimum in the rotor circumferential direction while indenting the outer wall between two maxima or the rotor can be divided over its circumference into at least two segments and the rotor external radius can be reduced down to the minimum between the two maxima in the rotor circumferential direction of at least one, preferably each segment.

Each segment preferably in turn has at least three sections, a calming section having at least approximately equal rotor external radius, a momentum section having small radius of curvature and an end section pointing toward the container exterior, and an interposed transition section. The described indentations of the outer wall of the container circumferential shell can again have a cross-section similar to a wing profile, but curved in the opposite direction, of course, which, originating from a cylindrical rotor shell, also indents this shell inward over a specific circumferential section.

Fundamentally, in devices according to the species, the filter elements rotate in the container around the container vertical axis along paths guided in a ring shape around the container axis. To improve the filter action on paths closer to the axis, it can be advantageous to provide at least two rotors, which are drivable in opposite directions or at different speeds around the container axis and carry filter elements. Using this measure, it is possible to even out the turbulent flows on movement paths of the filter elements close to and far away from the container axis.

If the bulges of the inner wall of the container circumferential shell of adjacent ring segments are arranged mirrored to one another, advantageous filtration conditions can be implemented and provided in the case of filter elements which oscillate around the container axis or are driven with alternating rotational direction, respectively.

Fundamentally, the heavy phase remaining in the container can be discharged from the container in the region of the container shell or in the region of the shell end faces, i.e., the top and/or bottom side of the container. If continuous operation is to be possible using the invention, it is preferable if the container outlet comprises at least one outlet opening arranged in the container peripheral shell in the region of the bulge, which preferably adjoins the bulge pointing in the container circumferential direction. Heavy molecules (heavy phases) are captured in the outlet and collect in the outlet channel while concentrating. Lighter molecules are guided toward the container center again by the guide unit. Therefore, in particular in continuous operation of the device, an improved concentration rate is possible. If a desired (measured) concentration rate is achieved in the outlet channel, the highly concentrated liquid can be discharged continuously or in cycles from the container. Liquid to be filtered can similarly be supplied to the container.

To suppress and prevent flows parallel to the container axis, i.e., transverse flows, in the shell region at least the bulge can be associated with at least one guide unit for the liquid, which is aligned in the container circumferential direction and extends over at least a part of the bulge and is inserted into the bulge. If needed, these guide units also extend around the entire container inner shell. Baffles of different lengths, for example, short, medium, and long, are particularly preferably used in a facility, which are provided in a fluidically optimized sequence in the respective bulge. These guide units, in particular baffles, can also be arranged in an equivalent manner on the stator or rotor provided in the region of the container axis.

For a further improvement of the flow picture prevailing on the filter elements in a desired direction, the filter elements can be trapezoidal or wedge-shaped structures having rounded and flattened shapes. This has the advantage that the undesired excess clearance between adjacent filter elements can be decreased and the effective usable filter area in a device can be increased. In order that only one filter shape has to be used, which is similarly suitable for smaller and larger paths to be implemented leading around the container axis, a trapezoidal shape is preferable, in the case of which the lateral end flanks of the filter elements are not consistently inclined to one another over the filter height, but rather the inclination increases continuously or in steps toward the inner trapezoid leg. Filter elements which have particularly thin but nonetheless mechanically strong flow channels for filtered liquids are provided if the structures comprise a rounded and flattened core which forms drainage lines similar to diatoms, i.e., like a diatom, and which is covered on the top and bottom sides using a filter element, in particular a film. The possible use of the above-described filter elements is not restricted to the present device, but rather also extends to devices from the prior art.

BRIEF DESCRIPTION OF THE DRAWINGS

The invention is schematically shown on the basis of an exemplary embodiment in the drawings. In the figures.

DESCRIPTION OF THE PREFERRED EMBODIMENT

Figure 1:
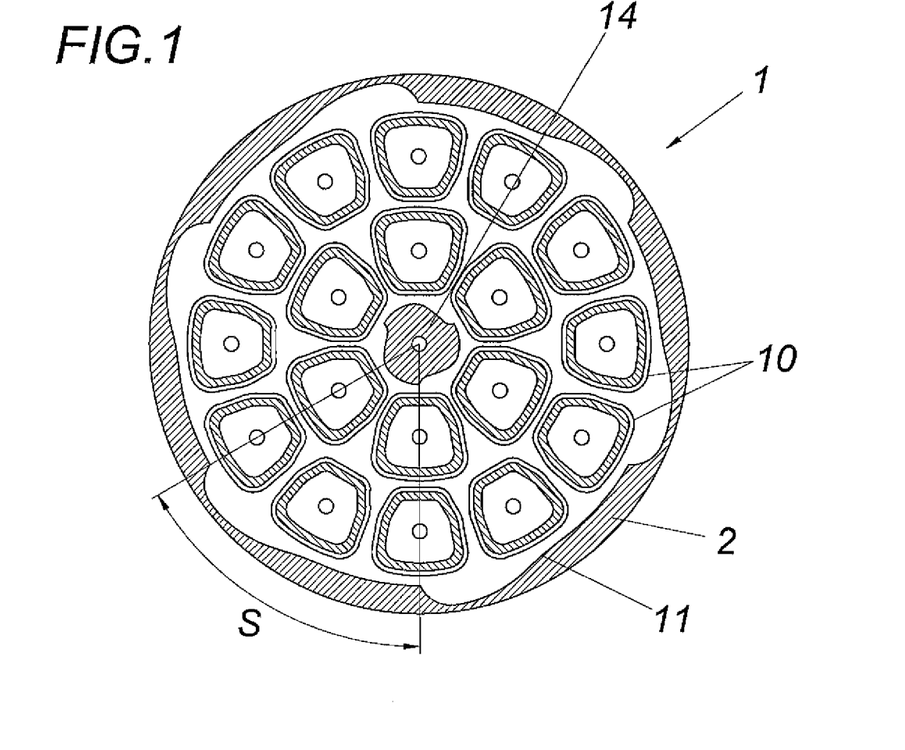
FIG. 1 shows a device according to the invention in a top view in partial section.
Figure 2:
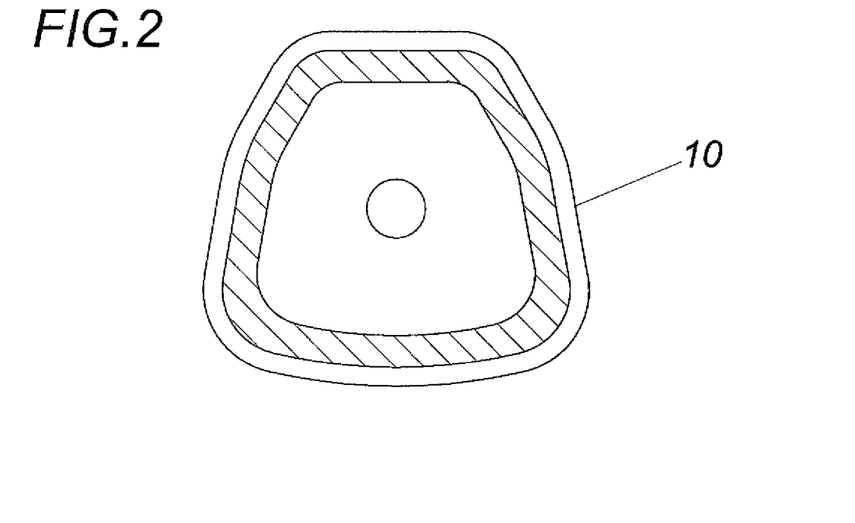
FIG. 2 shows an enlarged filter element from FIG. 1 in a top view.

A device 1 for filtering liquids comprises a container 2, units (not shown in greater detail) for introducing a liquid to be filtered into the container 2, which is typically introduced into the container 2 in the region of the container floor, a container outlet 4 for unfiltered liquid to be discharged from the container 2, and a rotor 6, which is drivable to rotate around the container axis 5, having a hollow shaft 8 mounted in the bottom end wall 7 and a support device 9 fastened thereon for filter elements 10, which are arranged with radial spacing to the container axis 5. The interior of the filter elements 10 opens via the support device 9 and the hollow shaft 8 out of the container 2 as the discharge for filtered liquid. Unfiltered liquid is conducted into the container outlet 4 via the outlet opening 12.

According to the invention, the container shell 11 is formed in such a manner that the container internal radius r of the inner wall 11 of the container circumferential shell is enlarged up to a maximum in the container circumferential direction while bulging the inner wall between two minima, this bulge forming a guide unit which guides the liquid to be filtered toward the filter elements 10.

The container circumferential cross-section of the inner wall of the container circumferential shell 11 is divided into at least two ring segments and the container internal radius r is enlarged up to the maximum in the container circumferential direction of each ring segment between the two minima. For example, in the exemplary embodiment according to FIG. 1 six ring segments and in the exemplary embodiment according to FIGS. 3 to 6 three ring segments are arranged uniformly distributed around the container circumference. The illustrated bulges in the inner wall of the container circumferential shell 11 have a cross-section similar to a wing profile. As can be inferred from FIG. 4 in particular, each ring segment S has at least three sections, a calming section, designated as a relaxation curve having at least approximately equal container internal radius r, a momentum section, shown as a momentum curve having small radius of curvature and an end section pointing toward the container interior, and an interposed transition section, shown as an acceleration curve or transition curve, in which the bulge is more strongly curved than in the region of the calming section, but is more weakly curved than in the region of the momentum section.

Figure 8:
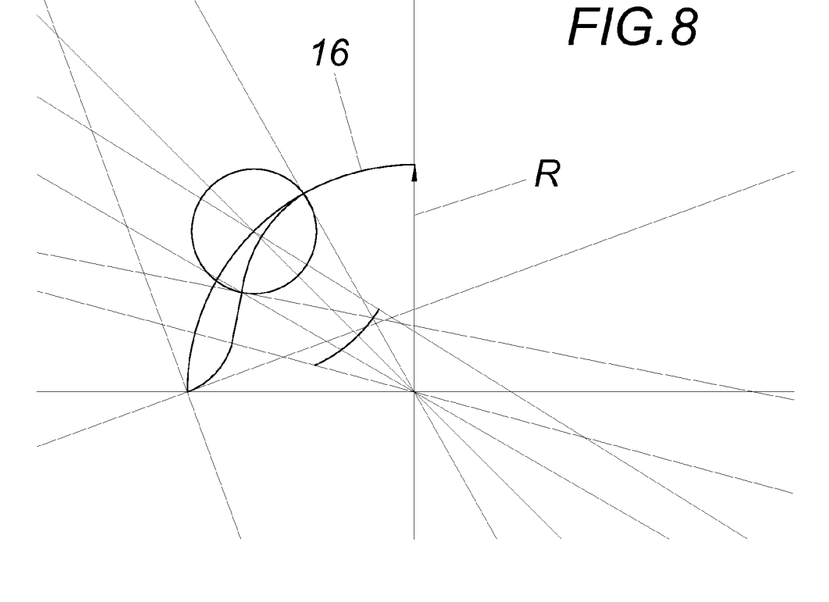
FIG. 8 shows an enlarged detail of the central rotor from FIG. 1.
Figure 9:
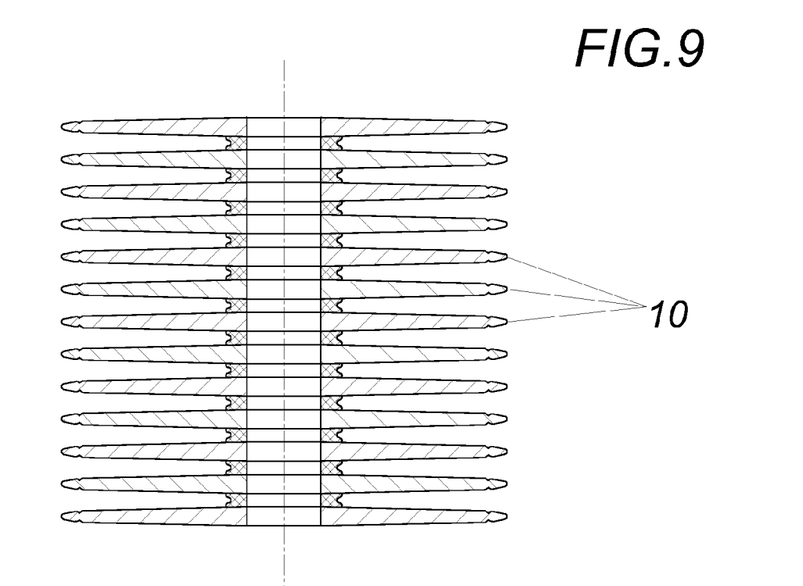
FIG. 9 shows a plurality of filter elements assembled to form a filter packet in a frontal view.

To improve the flow around the filter elements 10 lying closer to the container axis 5, a rotor 14 or stator, which has at least one guide unit for the fluid, is arranged in the region of the container axis 5, whose rotor external radius R of the rotor outer wall 16 is decreased down to a minimum in the rotor circumferential direction while indenting the outer wall between two maxima (see FIG. 8, for example). A stator could also be provided instead of the rotor 14. In the illustrated exemplary embodiment according to FIGS. 1 and 3 to 6, the rotor 14 is divided over its circumference into three segments, the rotor external radius in the rotor circumferential direction of each of the three segments being decreased, between the two maxima lying on a cylinder shell, to a minimum retracted in relation to this maximum. A type of blade surfaces are thus formed on the rotor, which displace the liquid to be filtered in a targeted manner toward the filter elements 10. In a similar manner to the bulges on the container inner shell 11, each segment of the rotor 14 has at least three sections, which comprise a calming section having at least equal rotor external radius, a momentum section having small radius of curvature and an end section pointing toward the container exterior, and an interposed transition section (FIG. 8).

To improve the flow conditions, the filtration performance, and to enlarge the filter area, at least two rotors 6, which are drivable in opposite directions or at different rotational speeds around the container axis and carry filter elements 10, can also be provided. In the exemplary embodiment according to FIGS. 4, 5, and 6, for example, one rotor carrying the filter elements 10 is provided. The filter elements are circular filter structures having rounded and flattened shapes in FIG. 4, a ring-shaped filter structure in FIG. 5, and trapezoidal filter structures 10 in FIG. 6. In the exemplary embodiment according to FIGS. 1 and 3, the filter elements 10 are fastened on two rotors, which are drivable around the container axis at different speeds. The filter elements 10 assigned to the individual circular paths can be driven at different speeds.

Figure 10:
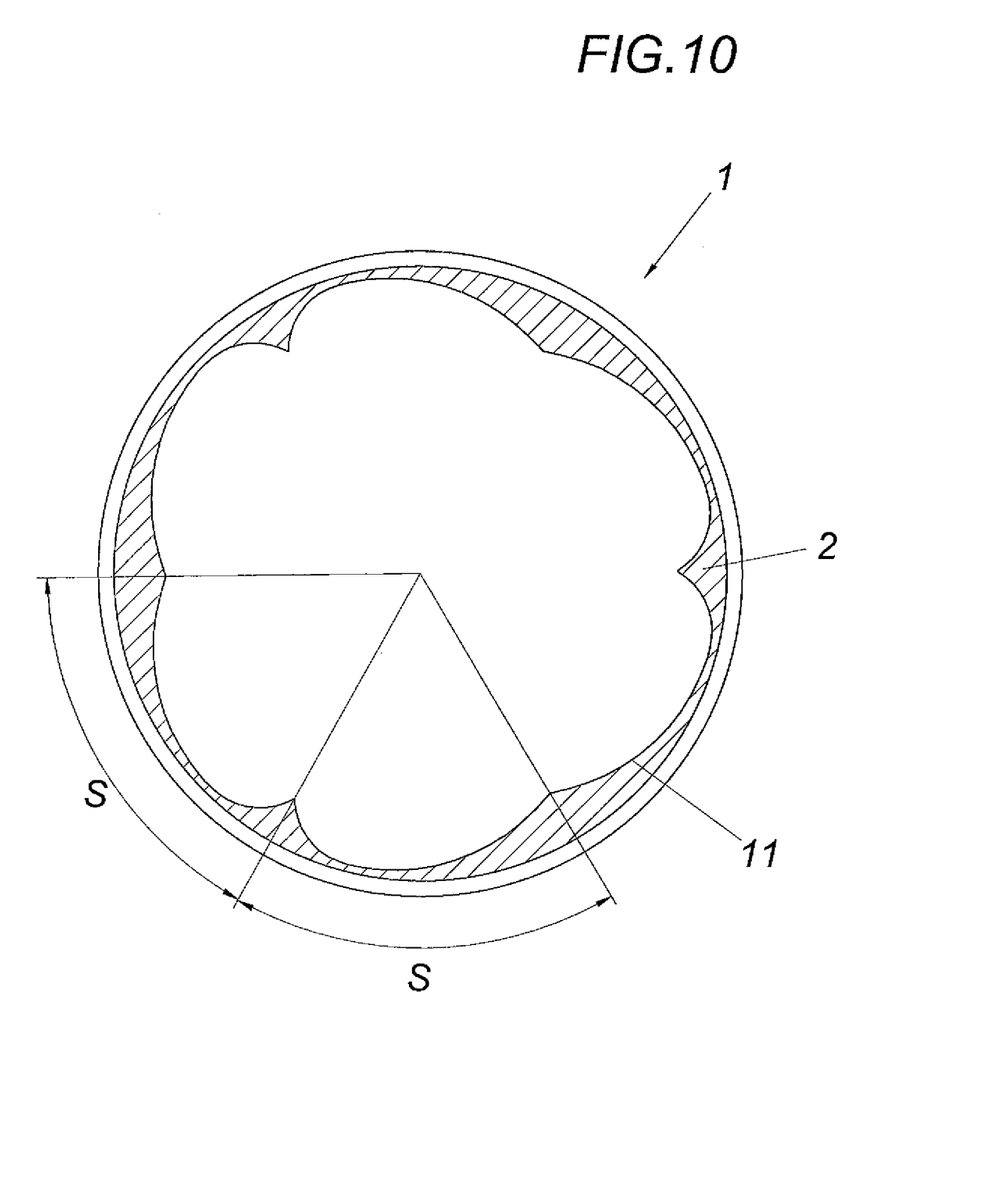
FIG. 10 shows a further design variant of the device from FIG. 1 in a top view in partial section.

A device, in particular a container inner shell 11, which is particularly well suitable for oscillating filter movements around the container axis 5 or for alternating rotational directions, respectively, is shown in FIG. 10, where the bulges of the inner wall of the container circumferential shell 11 of adjacent ring segments S are arranged mirrored to one another.

Figure 11:
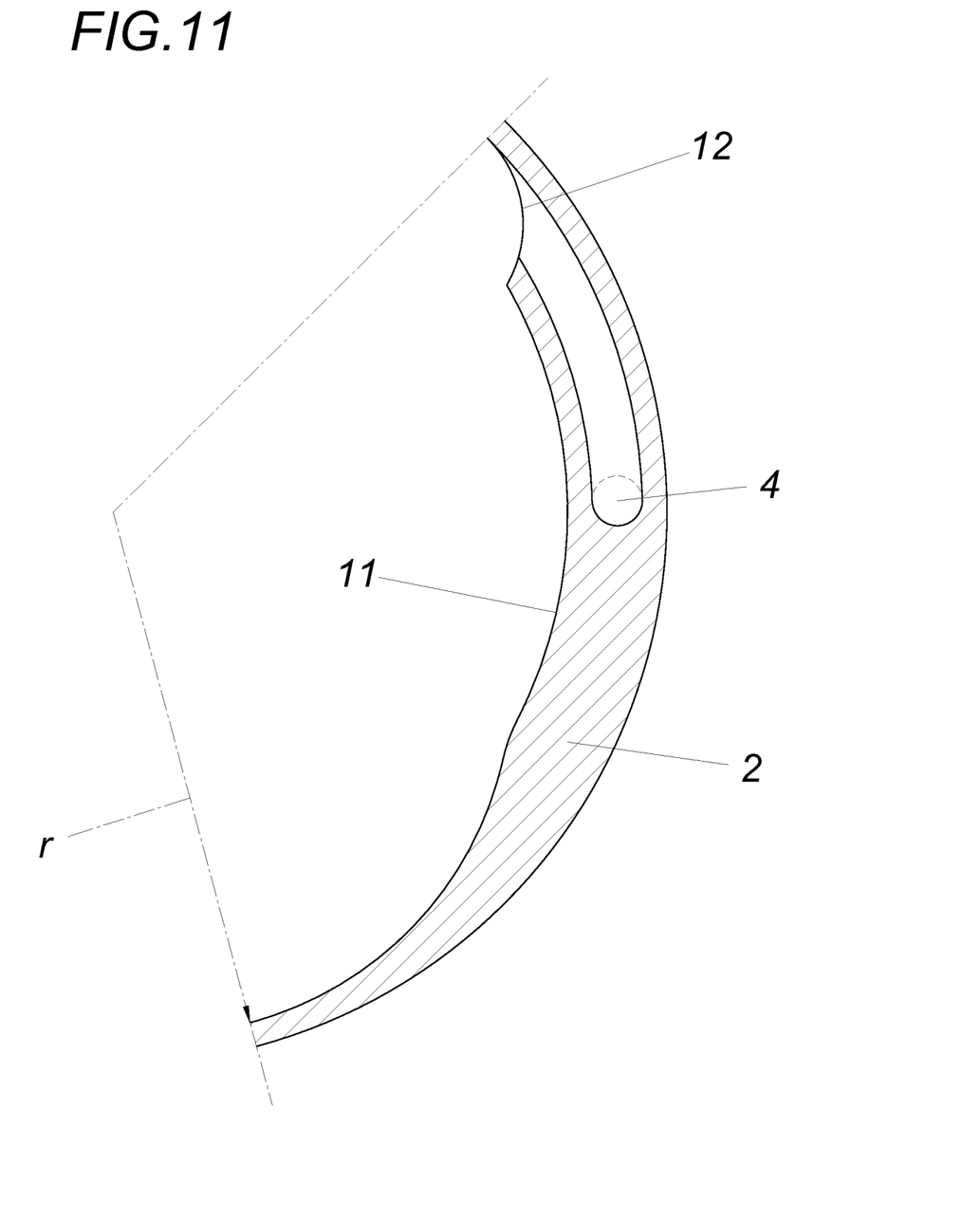
FIGS. 11 and 12 show a variant of a detail of a container shell from FIG. 7.

FIG. 11 shows a particularly advantageous arrangement for a container outlet, the container outlet 4 comprising an outlet opening 12, which is arranged in the container circumferential shell 11 in the region of the bulge, and which adjoins the bulge pointing in the container circumferential direction.

Figure 12:
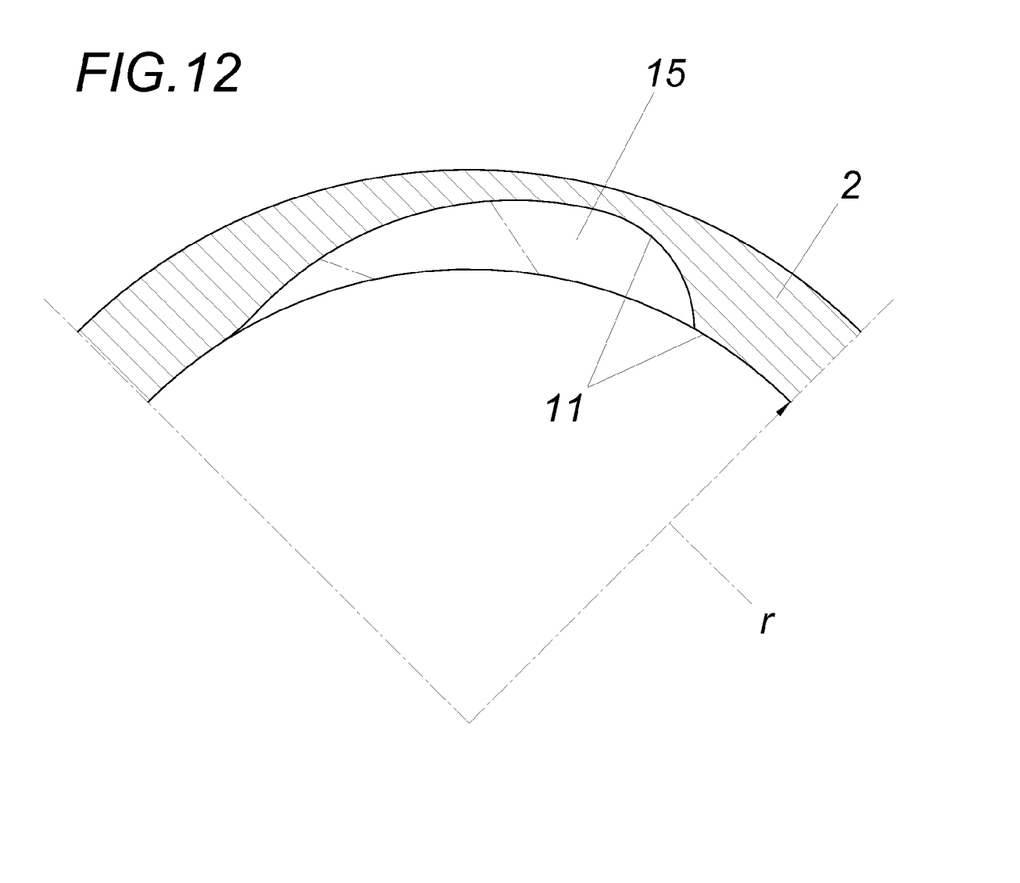
Figure 13:
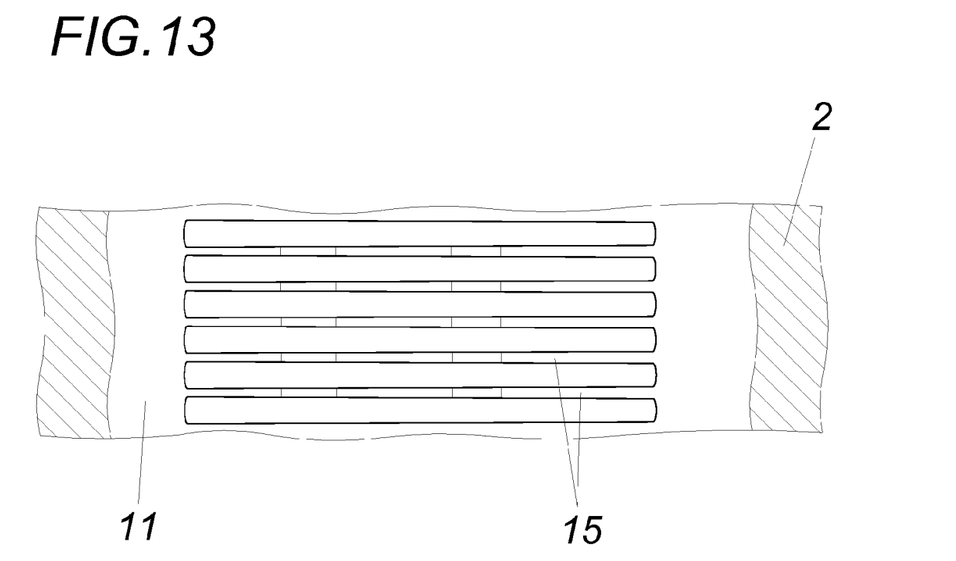
FIG. 13 shows a detail from FIG. 12 in the container longitudinal section.
Figure 14:
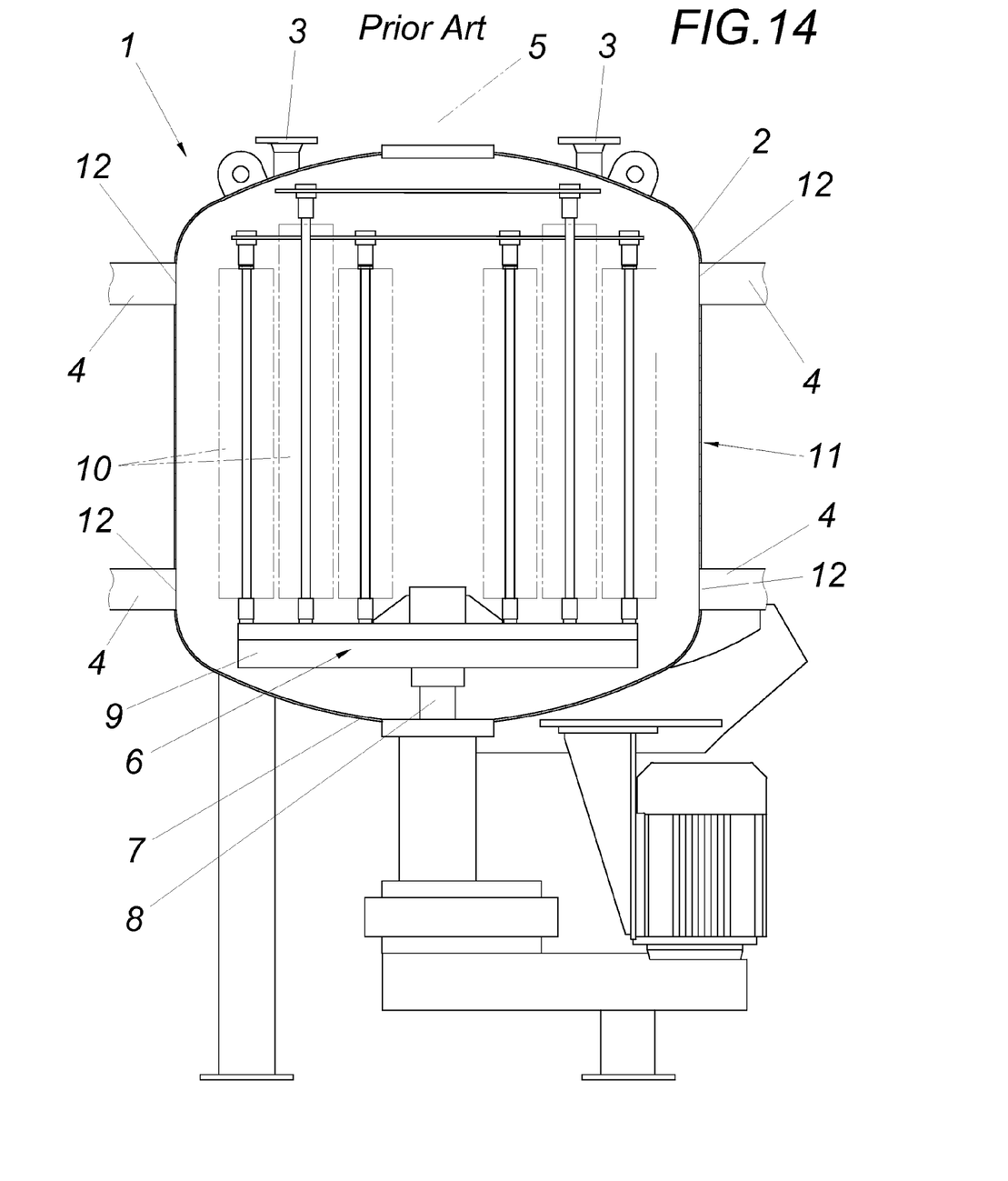
FIG. 14 shows a device according to the prior art.

In addition, guide units 15, which are assigned to the container circumference of the bulge and are aligned in the container circumferential direction and extend over at least a part of the bulge, can be associated, which help to suppress undesired transfers flows in the container. In FIG. 12, these guide units 15 extend over the entire bulge length. However, it is also indicated by dot-dash lines that various guide unit lengths can be provided, in particular medium or short.

Figure 3:
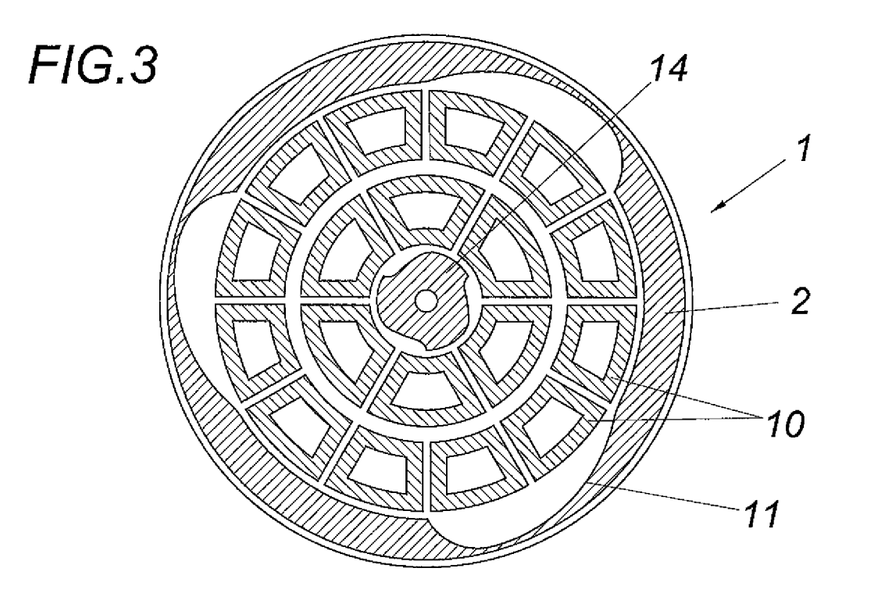
FIGS. 3 to 6 show design variants of the device from FIG. 1 in top views in partial section.
Figure 4:
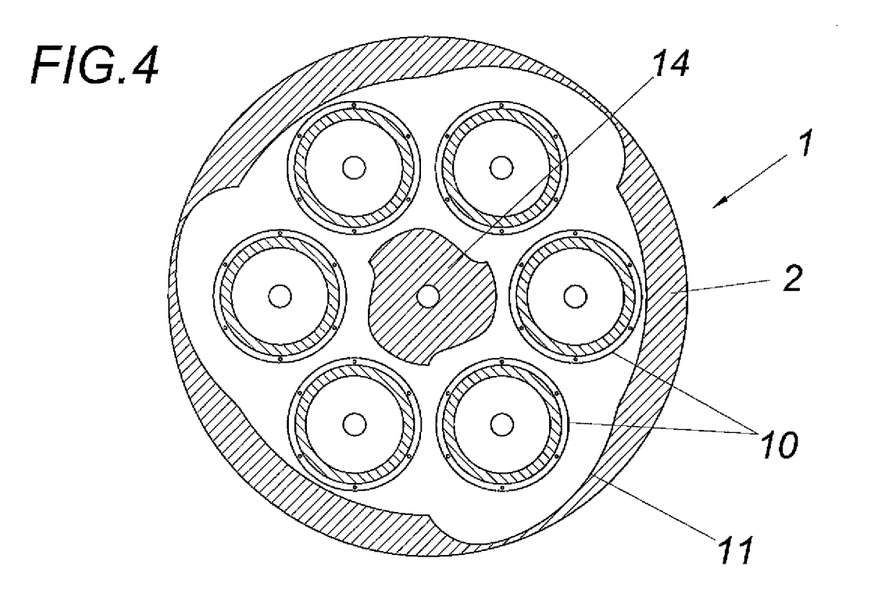
Figure 5:
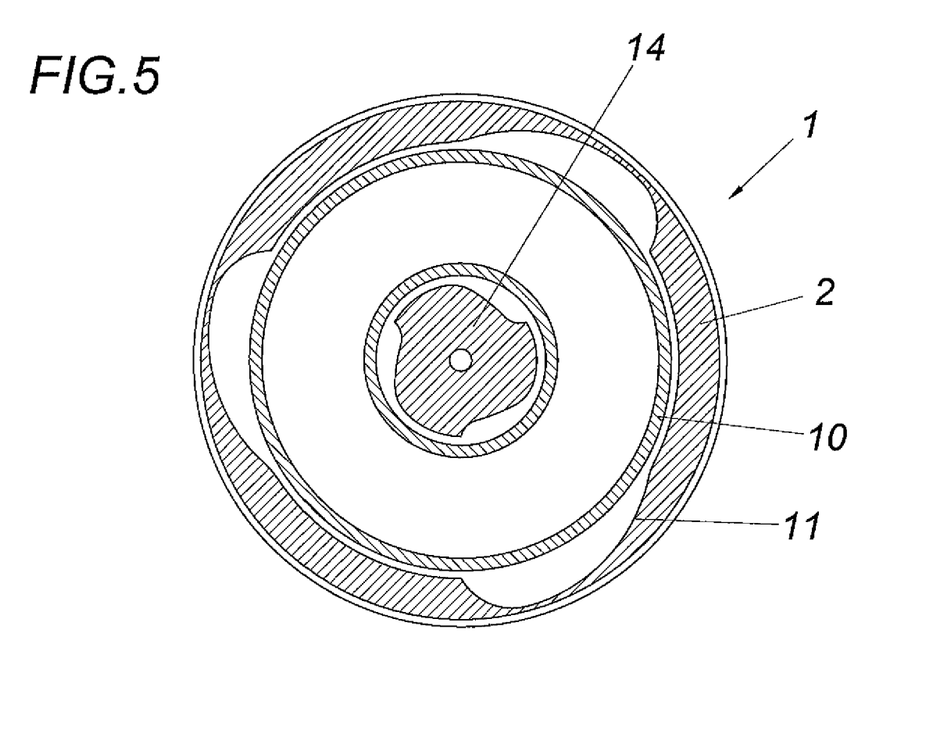
Figure 6:
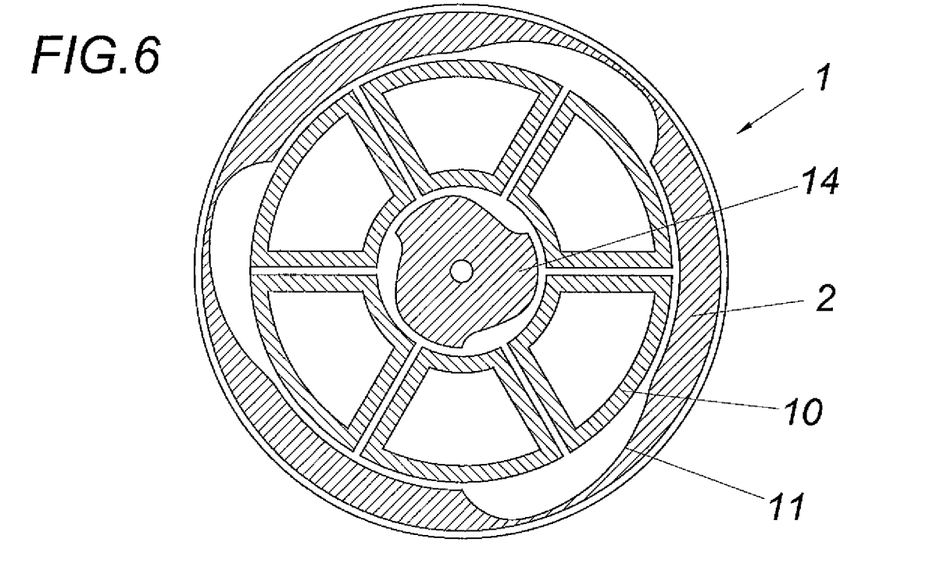
Figure 7:
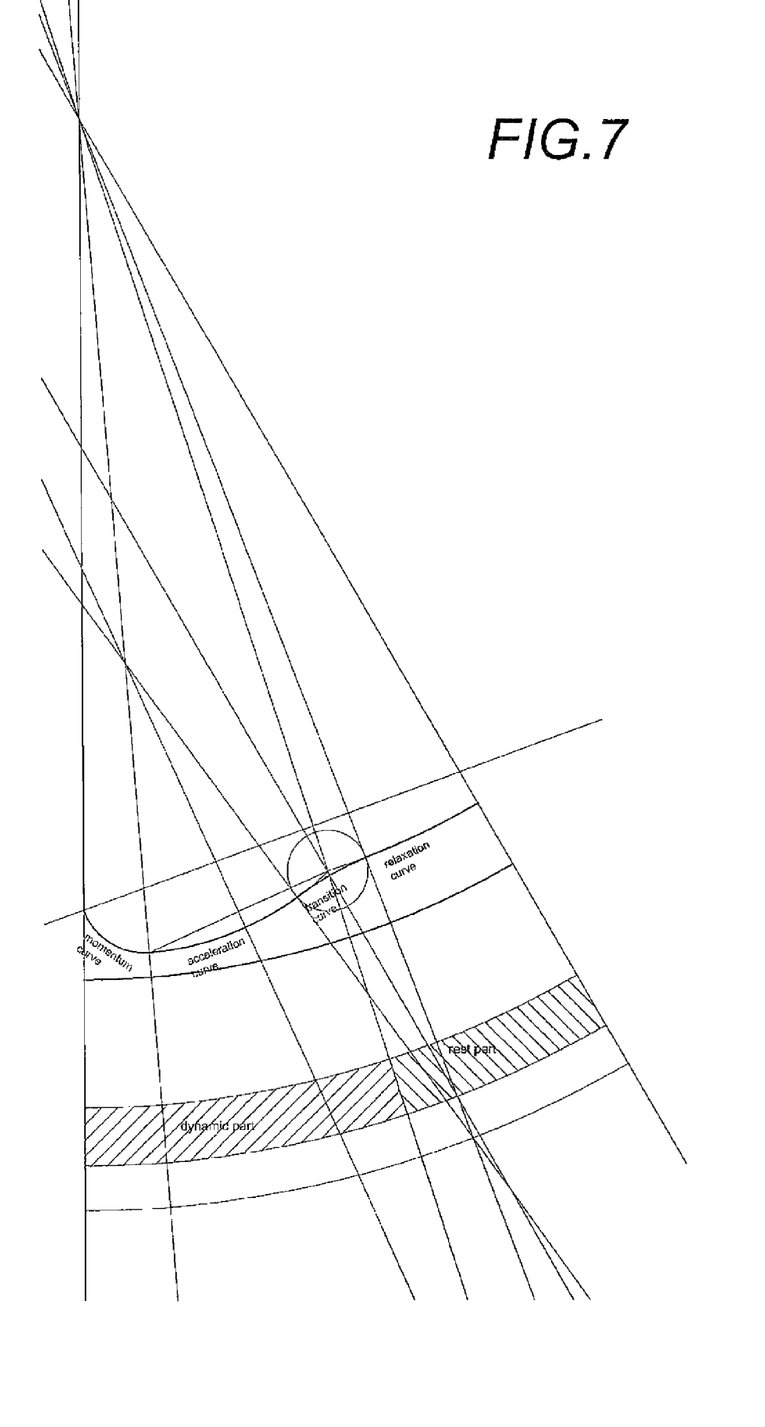
FIG. 7 shows an enlarged detail of the container shell from FIG. 1.

To maximize the filter area, the filter elements 10 in the exemplary embodiment according to FIGS. 1, 3, and 6 are trapezoidal structures having rounded and flattened shapes. The structures comprise rounded and flattened cores, which form drainage lines and are preferably constructed like diatoms, and which are covered on the top and bottom sides using a filter element, in particular a film.

The invention claimed is:

1. A device for filtering liquids, having a container, units for introducing a liquid to be filtered into the container, a container outlet for unfiltered liquid to be discharged from the container, and at least one rotor, which is drivable to rotate around the container axis, having a hollow shaft mounted in an end wall and a support device fastened thereon for filter elements, which are arranged with a clearance to the container axis or rotate around their own axis, and whose interior opens via the support device and the hollow shaft out of the container as the discharge for filtered liquid, wherein the inner wall of the container circumferential shell has a first container internal radius in the container circumferential direction and has second and third container internal radii less than the first container internal radius to form a bulge in the inner wall between the second and third container radii, the bulge comprising a guide unit which guides the liquid toward the filter elements, wherein the container circumferential cross-section of the inner wall of the container circumferential shell is divided into at least two ring segments and at least one ring segment contains the first container internal radius between the second and third container internal radii, and wherein each ring segment has at least first, second, third and fourth sections, the second section being interposed between the first section and the third section, the first section having an at least approximately uniform fourth container internal radius so that the liquid to be filtered is guided undisturbed, decelerated, and calmed in the first section, the second section having a first radius of curvature smaller than the fourth container internal radius, the third section having a second radius of curvature smaller than the first radius of curvature so that the liquid to be filtered is subsequently accelerated in the third section, and the fourth section leading toward the container interior.

2. The device according to claim 1, wherein a rotor or stator, which has at least one guide unit for the fluid, is arranged in the region of the container axis.

3. The device according to claim 2, wherein the rotor outer wall has a first rotor external radius in the rotor circumferential direction and second and third rotor external radii greater than the first rotor external radius to form an indentation in the outer wall between the second and third rotor external radii.

4. The device according to claim 2, wherein the rotor is divided over its circumference into at least two rotor segments and at least one rotor segment contains the first rotor external radius between the second and third rotor external radii.

5. The device according to claim 4, wherein each rotor segment has at least first, second, third, and fourth rotor sections, the second rotor section interposed between the first and third rotor sections, the first rotor section having an at least approximately uniform rotor external radius, the second rotor section having a second rotor radius of curvature larger than the uniform rotor external radius, the third rotor section having a third rotor radius of curvature smaller than the first radius of curvature, and the fourth rotor section leading toward the container exterior.

6. The device according to claim 1, wherein at least two rotors, which are drivable in opposite directions or at different speeds around the container axis and carry filter elements, are provided.

7. The device according to claim 1, wherein the bulges of the inner wall of the container circumferential shell of adjacent ring segments are mirrored to one another.

8. The device according to claim 1, wherein the container outlet comprises at least one outlet opening arranged in the container circumferential shell in the region of the bulge.

9. The device according to claim 8, wherein the outlet opening adjoins the bulge pointing in the container circumferential direction.

10. The device according to claim 1, wherein the guide unit is aligned in the container circumferential direction.

11. The device according to claim 1, wherein the filter elements are trapezoidal or wedge-shaped structures having rounded and flattened surfaces forming the filter surface, the spacing of connecting filter flanks of the filter elements, which laterally connect an inner flank and an outer flank to one another, decreasing in the filter plane from the outer flank toward the inner flank.

12. The device according to claim 11, wherein the structures comprise a rounded and flattened core, which implements drainage lines and is constructed like a diatom, and which is covered on the top and bottom sides using a filter element, in particular a film.

* * * * *